United States Patent
Hillairet et al.

(10) Patent No.: US 8,516,923 B2
(45) Date of Patent: Aug. 27, 2013

(54) AUTOMATIC BICYCLE PEDAL WITH LEAF SPRING

(75) Inventors: Jean Marc Hillairet, Varennes-Vauzelles (FR); Frédéric Rouderques, Nevers (FR)

(73) Assignee: Look Cycle International, Nevers (FR)

( * ) Notice: Subject to any disclaimer, the term of this patent is extended or adjusted under 35 U.S.C. 154(b) by 965 days.

(21) Appl. No.: 12/181,731

(22) Filed: Jul. 29, 2008

(65) Prior Publication Data
US 2009/0031850 A1 Feb. 5, 2009

(30) Foreign Application Priority Data

Aug. 1, 2007 (FR) ...................................... 07 05638

(51) Int. Cl.
*B62M 3/00* (2006.01)
*B62M 3/02* (2006.01)
*B62M 3/08* (2006.01)

(52) U.S. Cl.
USPC ............................. 74/594.7; 74/594.4; 36/131

(58) Field of Classification Search
USPC ............... 74/594.4–594.7; 36/131; 280/612; 24/510, 511; 474/152, 160–164
IPC ........ B62M 3/00, 3/02, 3/08; A43B 5/14; A63C 9/086, 9/088
See application file for complete search history.

(56) References Cited

U.S. PATENT DOCUMENTS

| | | | | |
|---|---|---|---|---|
| 4,928,549 A | * | 5/1990 | Nagano | 74/594.6 |
| 5,016,326 A | * | 5/1991 | Goldenberg | 24/511 |
| 5,105,683 A | * | 4/1992 | Mercat et al. | 74/594.6 |
| 5,259,270 A | * | 11/1993 | Lin | 74/594.6 |
| 5,381,708 A | * | 1/1995 | Liao | 74/594.6 |
| 6,076,427 A | * | 6/2000 | Nutto et al. | 74/594.6 |
| 6,477,917 B1 | | 11/2002 | Peyre et al. | |
| 2010/0005924 A1 | * | 1/2010 | Servignat et al. | 74/594.6 |

FOREIGN PATENT DOCUMENTS

| | | |
|---|---|---|
| DE | 19518084 | 11/1996 |
| DE | 29712758 | 9/1997 |
| EP | 0146454 | 6/1985 |
| EP | 0353169 | 1/1990 |
| EP | 0953502 | 11/1999 |
| FR | 2714014 | 6/1995 |
| FR | 2862041 A1 * | 5/2005 |

OTHER PUBLICATIONS

Search report in corresponding FR0705638.

* cited by examiner

*Primary Examiner* — Daniel Yabut
(74) *Attorney, Agent, or Firm* — Young & Thompson

(57) ABSTRACT

The pedal includes a pedal body (1) rotationally mounted on a pedal shaft. The pedal body (1) includes a fixed front catch element (4) and a movable rear catch element (6) that work with a retaining plate (3) fixed underneath the footwear of the cyclist. The movable rear catch element (6) is mounted to be able to pivot between a retaining position of the plate (3) and a position of release of the plate (3) by the pivoting of the rear catch element (6) in opposition to the action of an elastic return element (10). The elastic return element (10) is composed of an elastic leaf that forms a spring located in a longitudinal housing (11) of the pedal body (10) open to the rear, the leaf (10) being able to be stressed along its longitudinal axis in buckling during pivoting of the rear catch element.

18 Claims, 4 Drawing Sheets

AUTOMATIC BICYCLE PEDAL WITH LEAF SPRING

RELATED APPLICATIONS

This application claims priority to French Application No. 07.05638 filed on Aug. 1, 2007, the contents of which are incorporated herein by reference.

BACKGROUND OF THE INVENTION

1. Field of the Invention

This invention relates to an automatic pedal for a bicycle, especially a pedal for a touring bicycle, allowing the footwear of the cyclist to form a nonpositive connection to the pedal.

2. Description of the Related Art

The automatic pedal conventionally comprises a pedal body that is rotationally mounted on the pedal shaft with the capacity to be joined to the crank of the chain transmission. The concept of "automatic" is linked to the fact that the footwear bears a retaining block or plate that is fixed underneath the sole of the footwear of the cyclist and is designed to initiate hands-free fixing by quite simply drawing this retaining plate against the catch means provided on the pedal. The pedal is, moreover, provided with a support surface above the pedal shaft against which the retaining plate comes to rest.

The catch means provided on the pedal body generally comprises a front fixed catch element of the retaining plate and a rear movable catch element mounted to pivot on the pedal body around an axis of rotation parallel to the pedal shaft between a retaining position of said plate engaged between the front and rear catch elements, and a position of release of the plate by the pivoting of said rear catch element against the action of an elastic return means, of which one end is connected to the rear catch element and the other end is connected to said pedal body.

Such a quick-connect automatic pedal with a retaining plate is standard and is described in document EP 0 146 454, for example.

The plate is automatically engaged with the pedal by inserting the front end of the retaining plate into the front catch element on the pedal and by a pivoting motion of the plate downward; this makes the rear catch element pivot to the outside against the action of the elastic return means in order to allow insertion of the free end of the latter into the rear catch element. Then, the rear catch element automatically returns to its initial position by the action of the elastic return means.

Disengagement of the retaining plate, i.e., its release from the pedal, is done by a rotary motion of the plate around a vertical axis near the front end of the plate; this causes pivoting of the rear catch element that thus disengages. The interaction between these elements is described in detail in the aforementioned document. Moreover, this release of the retaining plate can also be controlled independently of the will of the cyclist during a fall, when the foot of the cyclist accomplishes the required movement; the pedal in this case plays a role of safety and protection.

There are a large number of automatic pedals that differ from one another essentially by the implementation of the automatic retaining means used to connect the block to the pedal body. They all share in common that they comprise an elastic return means of the movable rear catch element that prestresses this element toward the retaining position of the plate on the pedal body.

One of the ends of this elastic return means is thus connected to the rear catch element, while the other end is connected to the pedal body. In general, the elastic return means is thus composed of a metallic helical spring that can work by compression, as in the aforementioned document EP 0 146 454, or by torsion, as in publication FR 2 620 410.

These metallic helical springs are subject to a certain number of deficiencies because they are limited in overall dimensions, are characterized by major variations of stiffness, and accordingly require rather broad production tolerances or even additional devices for controlling the spring tension. They are by nature sensitive to corrosion and fatigue.

The use of elastomer springs to eliminate these deficiencies is also known, but these springs entail other problems due to the fact that they are easily affected by temperature and their creep can diminish their performance level and thus limit the possibilities of their use.

SUMMARY OF THE INVENTION

The purpose of the invention is to eliminate these deficiencies by suggesting a means of elastic return of the rear catch element from the pedal, which is extremely easy to produce and install, while preserving the conventional principle of operation of the rear catch element that can move as it pivots around an axis.

The object of the invention is an automatic pedal of a bicycle, comprising a pedal body rotationally mounted on a pedal shaft, which can be connected to the crank of the chain transmission, said pedal body comprising catch means of a retaining plate fixed underneath the footwear of the cyclist, said catch means being comprised of a fixed front catch element and a movable rear catch element that is mounted to be able to pivot on said pedal body around the axis of rotation that is essentially parallel to said pedal shaft, between a retaining position of said plate engaged between said front and rear catch elements, and a position of release of said plate by the pivoting of said rear catch element in opposition to the action of an elastic return means that is located in a housing of the pedal body, of which one end is connected to said rear catch element, while the other end is connected to said pedal body, characterized by the fact that said elastic return means comprises an extended elastic element that extends in a longitudinal plane relative to said pedal body so as to be stressed along its longitudinal axis in buckling by the rear catch element when the latter is pivoted towards the position of release of said retaining plate.

According to other characteristics of the invention:
said elastic element is prestressed in buckling;
said housing is laterally arranged on the outside of said pedal body and open at least toward the rear;
the rear end of said elastic element is freely accommodated in a rear recess provided in the lower part of said rear catch element and is offset toward the bottom relative to said axis of rotation of the latter;
said rear recess has a rounded bottom that is complementary to the shape of the rear end of said elastic element so as to form a pivot link;
the front end of said elastic element is freely accommodated in a front recess provided in said housing, this recess having a rounded bottom that is complementary to the shape of the front end of said elastic element so as to form a pivot link;
said elastic element is a leaf;
said leaf is made of composite material;
at least the rear end of said elastic element is provided with a U-shaped fitting;
said rear recess is located in an extension of said rear catch element toward the bottom;

said extension is directly underneath said rear recess that is deflected toward the front so as to extend its lower part;

said elastic element extends over at least two-thirds of the length of the pedal body;

said elastic element is vertically stressed in buckling toward the bottom;

said elastic element is vertically stressed in buckling toward the top;

said elastic element is horizontally stressed in buckling toward the outside;

said elastic element is horizontally stressed in buckling toward the inside;

there is a stop in said housing to limit the buckling of said elastic element to a single direction.

BRIEF DESCRIPTION OF THE DRAWING FIGURES

Other characteristics and advantages of the invention will become apparent from the following description of several nonlimiting embodiments of the invention, with reference to the attached figures, in which.

DETAILED DESCRIPTION OF THE INVENTION

In the figures, identical or equivalent components will have the same reference numbers.

FIGS. 1 to 6 show a first embodiment of the automatic pedal according to the invention. The pedal conventionally comprises a pedal body 1 that is rotationally mounted on the pedal shaft 2 that is designed to be connected to the crank of the chain transmission of the bicycle (not shown).

Figure 1:
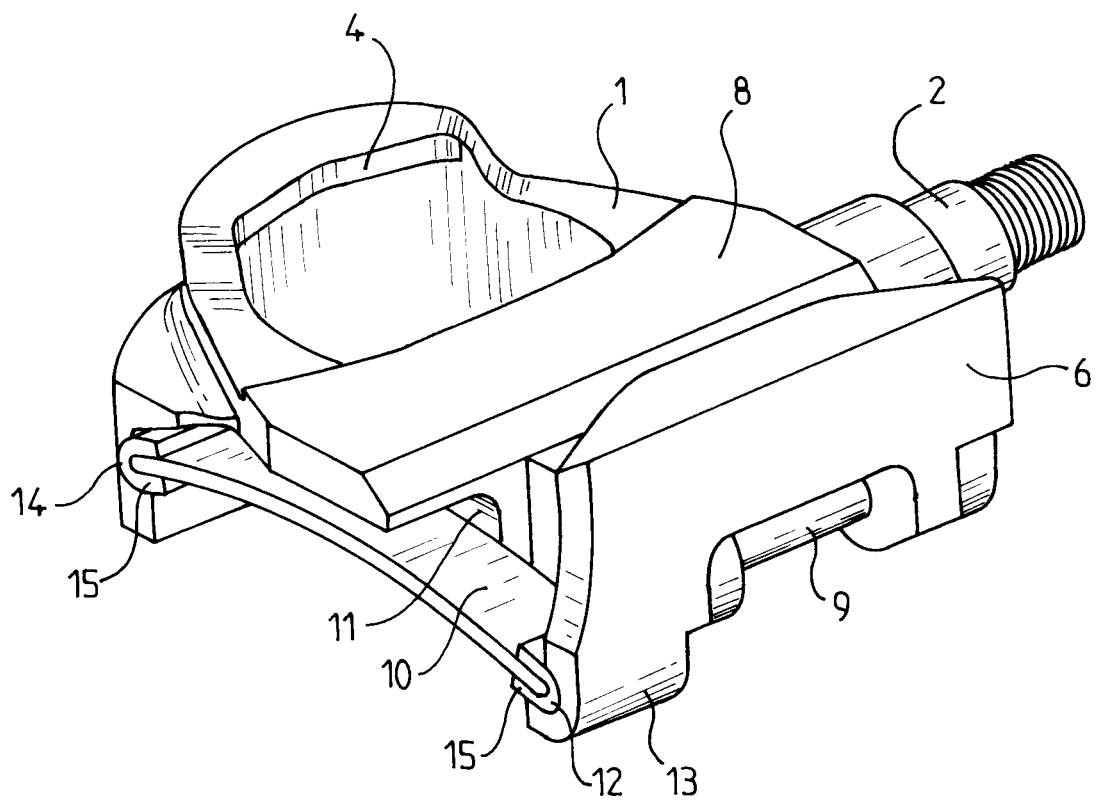
FIG. 1 is a perspective view of an automatic pedal according to a first embodiment of the invention when the elastic element buckles upward, with prestressing.
Figure 2:
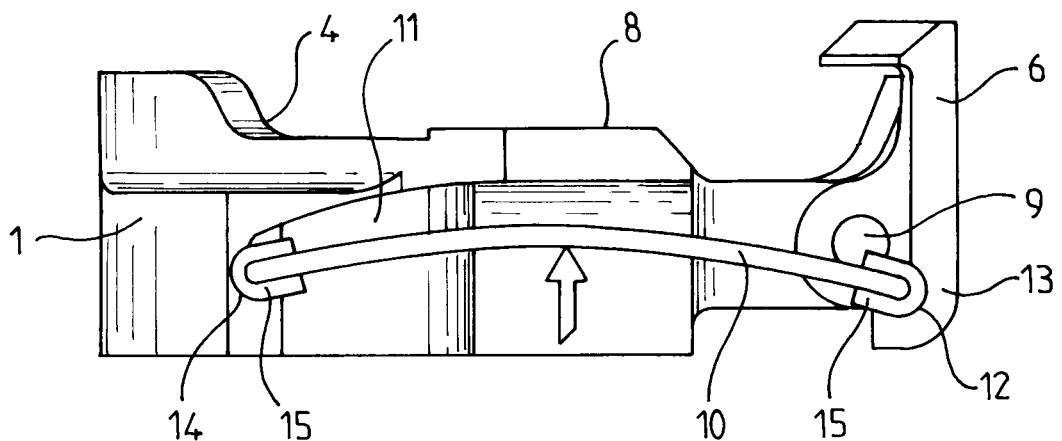
FIG. 2 is a side view of the pedal from FIG. 1.
Figure 3:
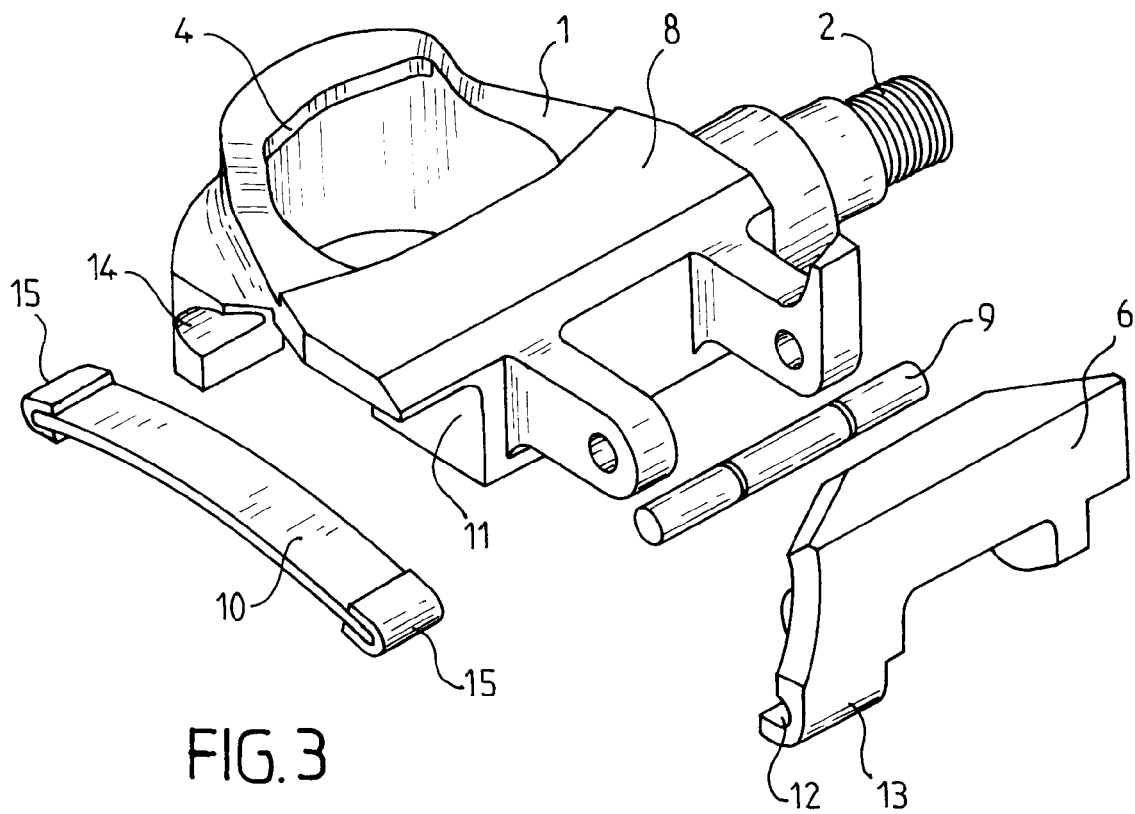
FIG. 3 is an exploded view of the pedal from FIG. 1.
Figure 4:
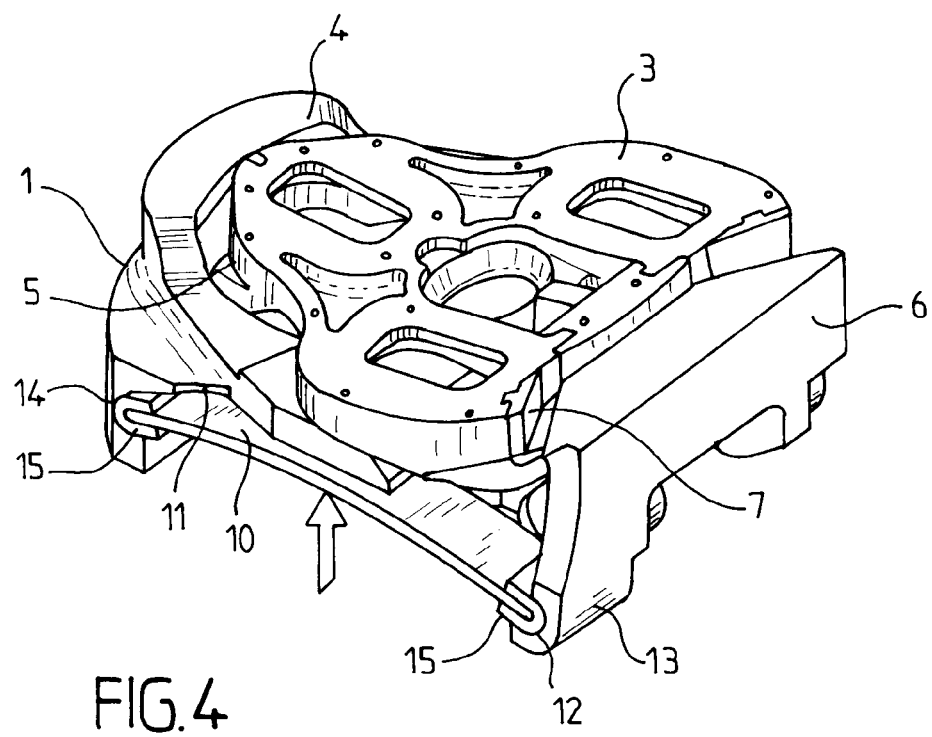
FIG. 4 is a perspective view illustrating a retaining plate in the retaining position engaged between the catch elements on the pedal according to the invention.
Figure 5:
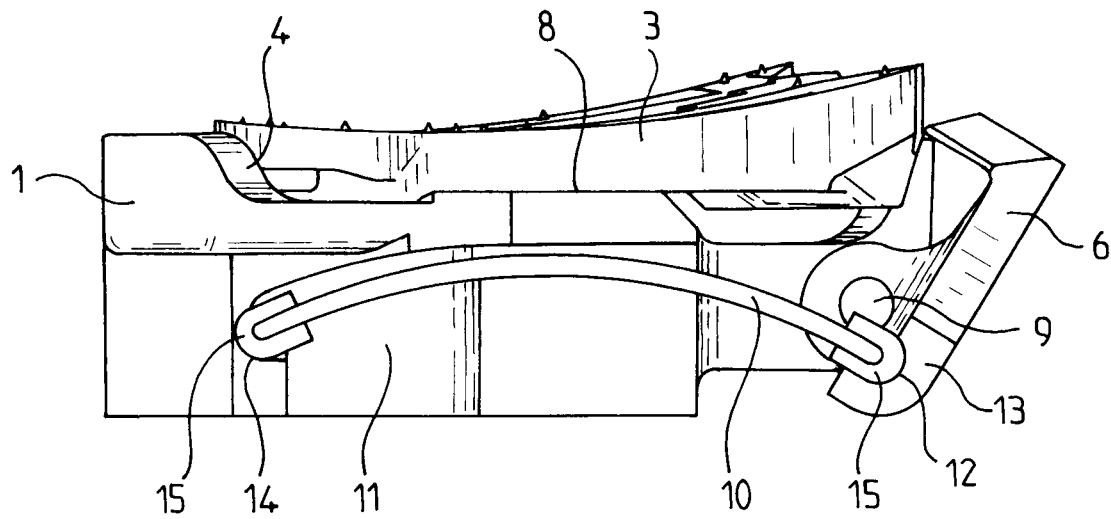
FIG. 5 is a side view illustrating the retaining plate in the position of its disengagement from between the catch elements on the pedal.
Figure 6:
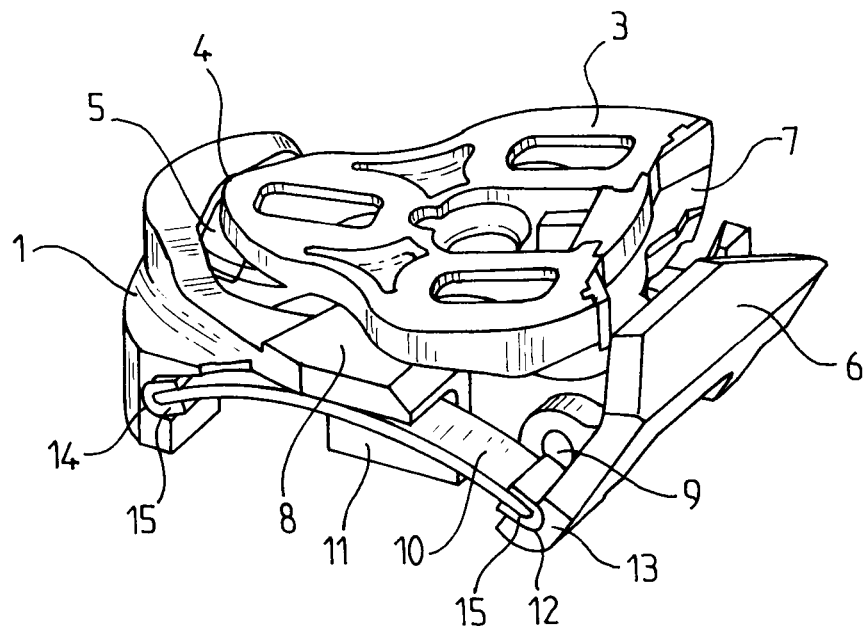
FIG. 6 is a perspective view illustrating the retaining plate in the position of its disengagement from between the catch elements on the pedal.

The pedal body 1 is provided with means of catching with a retaining block or plate 3 illustrated in FIGS. 4 to 6. This retaining plate is fixed under the sole of the footwear of the cyclist (not shown).

The catch means are composed of a front fixed catch element that can work with a male connecting element 5 in the form of a lip provided in front of the retaining plate 3, and a rear movable catch element 6 that can work with a female connecting element 7 in the form of a recess provided behind the retaining plate (see FIG. 4).

The pedal is, moreover, provided with a support surface 8 above the pedal shaft 2 against which the retaining plate 3 comes to rest.

The rear catch element 6 has the form of a lever that is mounted to pivot on the pedal body 1 around an axis of rotation 9 that is essentially parallel to the pedal shaft 2, between a retaining position illustrated in FIG. 4 in which the retaining plate 3 is engaged between the front and rear catch elements 4, 6, and a release position illustrated in FIGS. 5 and 6, in which the retaining plate 3 is normally pivoted to the outside or even to the inside, for example during a fall, as is illustrated in FIG. 6 to better show the details of the invention.

The rear catch element 6 is pivoted toward the rear from the retaining position to the position of release of the retaining plate 3 in opposition to the action of an elastic return means of which one of the ends is connected to the rear catch element 6 and the other end is connected to the pedal body 1.

According to the invention, this elastic return means comprises an extended elastic element 10 that extends in a longitudinal plane relative to the pedal body 1 so as to be stressed along its longitudinal axis in buckling by the rear catch element 6 when the latter is pivoted towards the position of release of the retaining plate 3.

This extended elastic element 10 can be quite easily comprised of a metal wire with the desired elasticity, but it is preferably composed of an elastic leaf as is illustrated in the figures. The leaf 10 extends over at least two thirds of the length of the pedal as it is located in a longitudinal housing 11 provided in the pedal body 1. This housing 11 is open at least toward the rear in order to allow connection of one of the ends of the leaf 10 to the rear catch element 6.

In the embodiment illustrated in the figures, this housing 11 is arranged laterally on the outside of the pedal body 1, and is, moreover, open to the bottom and on the side. The housing 11 can, of course, be closed toward the bottom and on the side in order to keep only one opening toward the rear.

In the embodiment illustrated in FIGS. 1 to 6, the upper part of the housing 11 is suited to allowing the leaf 10 to be stressed along its longitudinal axis in buckling vertically to the top. The direction of buckling is shown by an arrow in some of the figures.

According to another characteristic of the invention, the leaf 10 is prestressed in buckling in order to facilitate the start of its loading by suppressing the peak force necessary to cause the leaf to pass from straight extension to buckled extension.

The rear end of the leaf 10 is advantageously freely accommodated in an extended rear recess 12 provided in the lower part of the rear catch element 6 and offset toward the bottom relative to the axis of rotation 9 of the latter. This rear recess in the illustrated embodiment is located in an extension 13 of the rear catch element 6 toward the bottom. This extension directly underneath said rear recess 12 is deflected toward the front so as to extend its lower part as it forms a stop toward the bottom for the end of the leaf to prevent it from sliding out of the recess.

The front end of the leaf 10 can be attached and encased in a vertical wall of the housing 11, but it is preferably likewise freely held in an extended front recess 14 in order to avoid major stresses around the casing of the pedal body that can be made of, for example, injected plastic.

The rear recess 12 and the front recess 13 advantageously have a rounded bottom with a shape that is complementary to the shape of the ends of the leaf to form pivot links. In the illustrated example with an elastic element in the form of a leaf, this bottom is cylindrical, while this bottom can be spherical if a wire is used instead of a leaf.

The leaf 10 can advantageously be made of composite material, for example carbon fibers, and—by the selection of a composition of layers—the value of stiffness in bending that is desirable for the leaf can be obtained.

The advantages of a leaf made of composite material are, among others, excellent resistance to corrosion, and essentially unlimited resistance to fatigue, provided that the leaf is sized correctly.

However, a leaf made of composite material is generally obtained by a combination of superimposed reinforcing layers, separated by less resistant resin layers, and there is a risk of delamination on the ends over the long term or at least premature wear of the layers in contact with the ends that withstand high pressure.

To moderate this wear by friction and bruising, each end of the leaf 10 is advantageously protected by a U-shaped fitting 15 of relatively hard material, for example metal.

Figure 7:
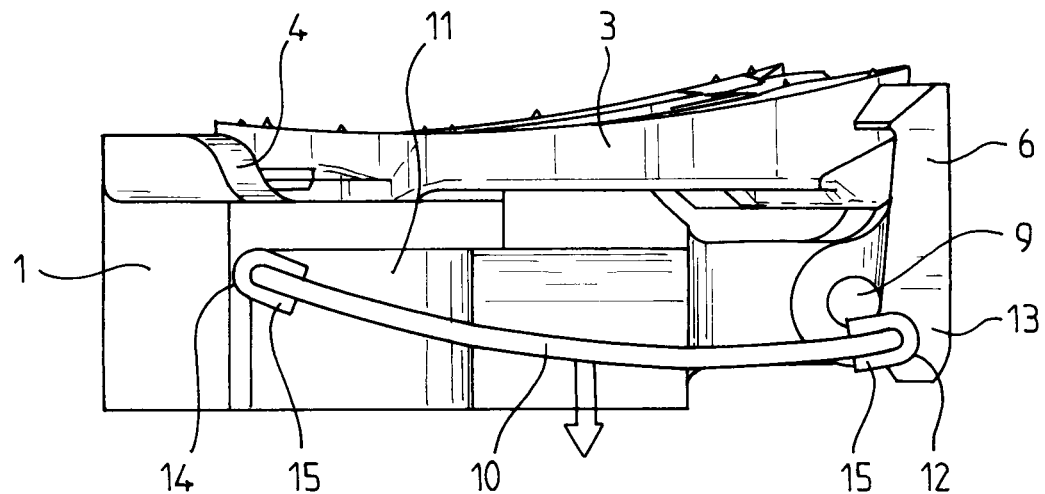
FIG. 7 is a side view of an automatic pedal according to a second embodiment of the invention when the elastic element buckles downward, with prestressing.

FIG. 7 illustrates a second embodiment of the invention that differs from the first by the fact that the leaf 10 is mounted in buckling vertically toward the bottom. The leaf 10 is mounted prestressed in this direction.

Figure 8:
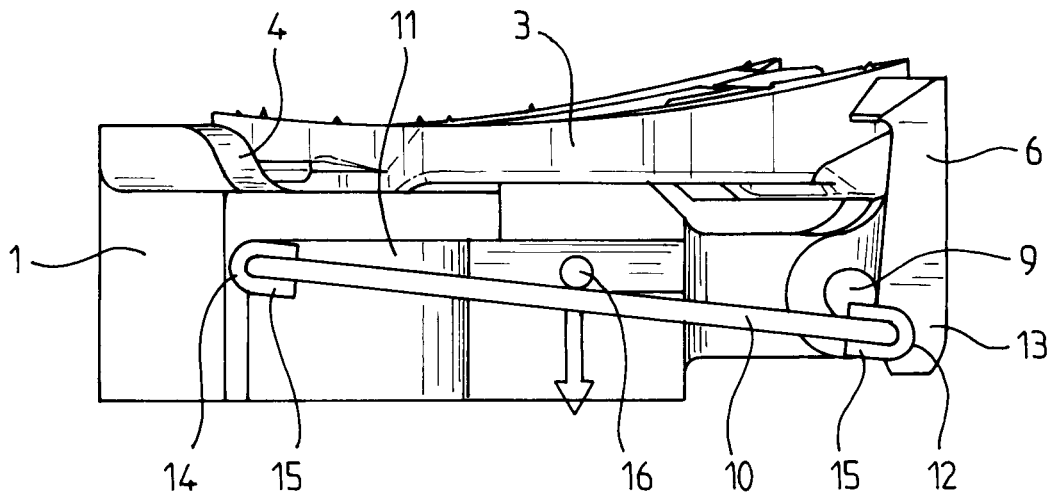
FIG. 8 is a side view of an automatic pedal according to a third embodiment of the invention when the elastic element buckles downward, without prestressing.

FIG. 8 illustrates a third embodiment of the invention in which the leaf 10 is likewise mounted in buckling vertically toward the bottom, but without prestressing.

Finally, FIG. 8 shows the presence of a stop 16 placed above the leaf 10 to limit its buckling to a single direction, i.e., toward the bottom. In the illustrated example, this stop has the form of a cylindrical pin that projects into the housing 11 and that can, if necessary, be adjustable in height in order to obtain prestressing of the leaf.

Of course, the invention is not limited to the embodiments that are described and illustrated in the figures, but numerous versions can be envisioned without thereby departing from the scope of the invention. It is possible, for example, to mount the elastic element 10 such that it is stressed in buckling horizontally toward the inside or toward the outside.

Moreover, even if situating the longitudinal housing 11 on the outside is preferred, it would be equally possible to place it centrally in the body of the pedal 1, but in this case, it is necessary to shift the leaf toward the bottom to place it at a distance underneath the pedal shaft. It is apparent that in this case, it is advantageous for the leaf to be mounted in buckling toward the bottom underneath the pedal shaft. It is the same if a second elastic leaf placed in a second housing on the inside of the pedal body is to be used.

LOOK L070107—Automatic Bicycle Pedal with Leaf Spring

1—Pedal body
2—Pedal shaft
3—Retaining plate (block)
4—Fixed front catch element (claw)
5—Male connecting element (on 3)
6—Movable rear catch element (lever)
7—Female connecting element (on 3)
8—Support surface
9—Axis of rotation
10—Elastic return means (leaf)
11—Longitudinal housing
12—Rear recess (in 6)
13—Extension (of 6)
14—Front recess (in 1)
15—U-shaped fitting
16—Stop

The invention claimed is:

1. An automatic pedal of a bicycle, comprising:
a pedal body (1); and
a pedal shaft (2), the pedal body being rotationally mounted on the pedal shaft;
said pedal body (1) comprising a catch (4, 6) of a retaining plate (3), said catch being comprised of a fixed front catch element (4) and a movable rear catch element (6) that is mounted to pivot on said pedal body (1) around an axis of rotation (9) that is essentially parallel to said pedal shaft (2) between a retaining position of said plate (3) engaged between said front and rear catch elements (4, 6), and a position of release of said plate (3) by the pivoting of said rear catch element (6) in opposition to an action of an elastic return element (10) that is located in a housing (11) of the pedal body (2), of which one end of the elastic return element (10) is connected to said rear catch element (6), while another end of the elastic return element (10) is connected to said pedal body (1),
wherein said elastic return element (10) comprises an elongate elastic return element (10) that extends in a longitudinal plane relative to said pedal body (1) so as to be stressed along a longitudinal axis of the elongate elastic return element (10) in buckling by the rear catch element (6) when the rear catch element (6) is pivoted towards the position of release of said retaining plate.

2. The automatic pedal according to claim 1, wherein said elongate elastic element (10) is prestressed in buckling.

3. The automatic pedal according to claim 1, wherein said elongate elastic element (10) is a leaf.

4. The automatic pedal according to claim 1, wherein said housing (11) is arranged laterally from the outside of said pedal body (1) and is open at least toward the rear.

5. The automatic pedal according to claim 1, wherein said one end of said elongate elastic element (10) is freely accommodated in a rear recess (12) provided in the lower part of said rear catch element (6) and is offset toward a bottom region of said pedal body relative to said axis of rotation (9) of the rear catch element (6).

6. The automatic pedal according to claim 5, wherein said rear recess (12) has a rounded bottom that is complementary to the shape of said one end of said elongate elastic element (10) so as to form a pivot link.

7. The automatic pedal according to claim 6, wherein said another end of said elongate elastic element (10) is freely accommodated in a front recess (14) provided in said housing (11), this recess having a rounded bottom that is complementary to the shape of said another end of said elongate elastic element (10) so as to form a pivot link.

8. The automatic pedal according to claim 5, wherein at least said one end of said elongate elastic element (10) is provided with a U-shaped fitting (15).

9. The automatic pedal according to claim 5, wherein said rear recess (12) is located in an extension (13) of said rear catch element (6) toward the bottom region of said pedal body.

10. The automatic pedal according to claim 9, wherein said extension (13) is directly underneath said rear recess (12) that is deflected toward the front so as to extend a lower part of the extension (13).

11. The automatic pedal according to claim 1, wherein said elongate elastic element (10) extends over at least two-thirds of the length of the pedal body (1).

12. The automatic pedal according to claim 1, wherein said elongate elastic element (10) is vertically stressed in buckling toward a bottom region of said pedal body.

13. The automatic pedal according to claim 1, wherein said elongate elastic element (10) is vertically stressed in buckling toward a top region of said pedal body.

14. The automatic pedal according to claim 1, wherein there is a stop in said housing to limit the buckling of said elongate elastic element (10) to a single direction.

15. The automatic pedal according to claim 2, wherein said elongate elastic element (10) is a leaf.

16. The automatic pedal according to claim 6, wherein at least the rear end of said elongate elastic element (10) is provided with a U-shaped fitting (15).

17. The automatic pedal according to claim 7, wherein at least the rear end of said elongate elastic element (10) is provided with a U-shaped fitting (15).

18. An automatic pedal of a bicycle, comprising:
 a pedal body (1); and
 a pedal shaft (2), the pedal body being rotationally mounted on the pedal shaft;
 said pedal body (1) comprising a catch (4, 6) of a retaining plate (3) fixed underneath footwear of a cyclist, said catch being comprised of a fixed front catch element (4) and a movable rear catch element (6) that is mounted to be able to pivot on said pedal body (1) around an axis of rotation (9) that is essentially parallel to said pedal shaft (2) between a retaining position of said plate (3) engaged between said front and rear catch elements (4, 6), and a position of release of said plate (3) by the pivoting of said rear catch element (6) in opposition to an action of a leaf (10) formed from composite material that is located in a housing (11) of the pedal body (2), of which one end of the leaf (10) is connected to said rear catch element (6), while another end of the leaf (10) is connected to said pedal body (1),
 wherein said leaf (10) extends in a longitudinal plane relative to said pedal body (1) so as to be stressed along a longitudinal axis of the leaf (10) in buckling by the rear catch element (6) when the rear catch element (6) is pivoted towards the position of release of said retaining plate.

\* \* \* \* \*